Nov. 18, 1969   H. KRAUSE   3,479,099
SEAT SLIDE STRUCTURES
Filed Nov. 20, 1967   2 Sheets-Sheet 1
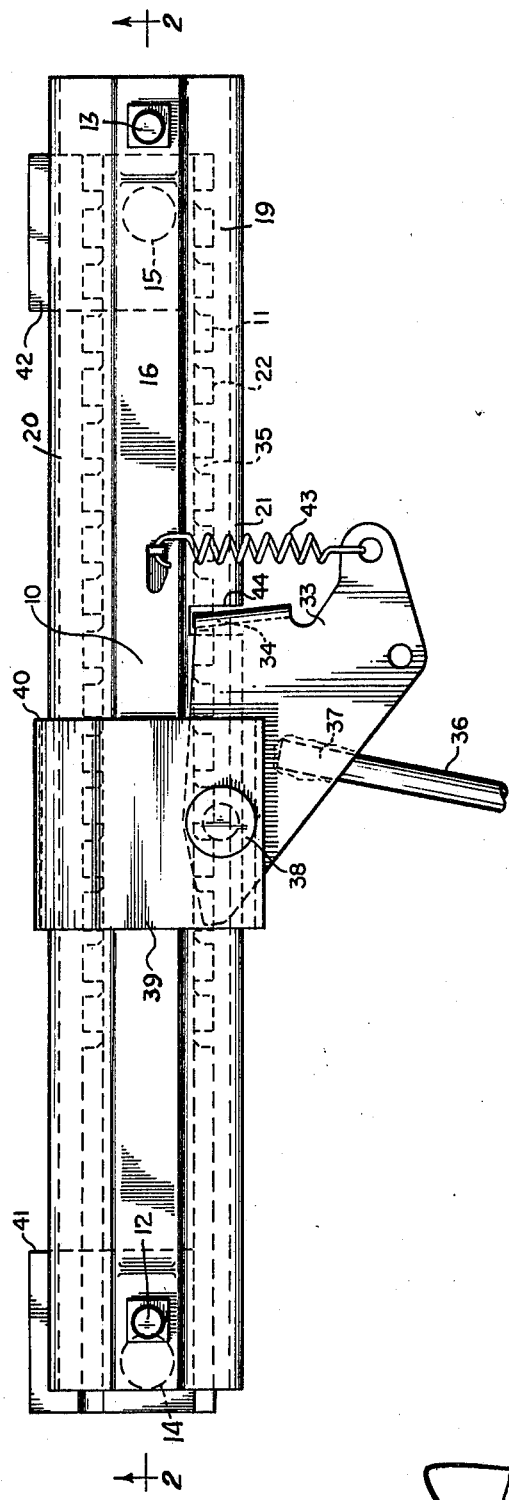
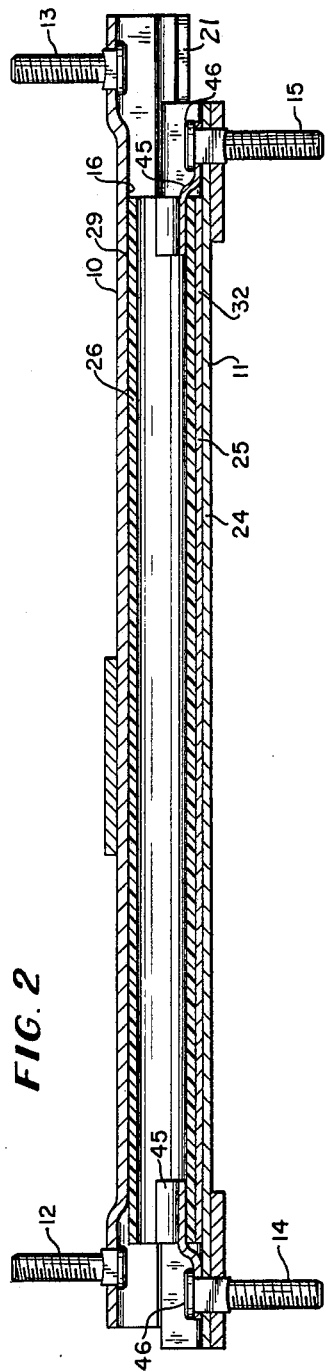
INVENTOR:
HERBERT KRAUSE
Andrew F. Wintercorn
ATTY.

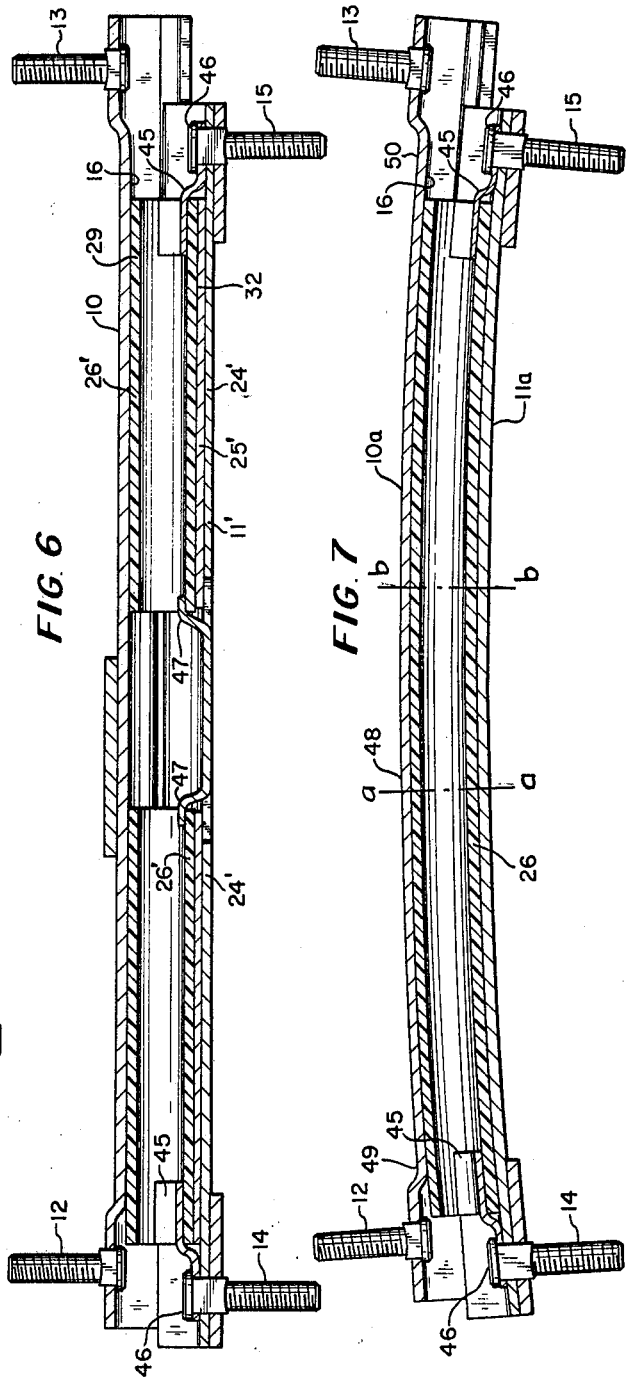

United States Patent Office

3,479,099
Patented Nov. 18, 1969

3,479,099
SEAT SLIDE STRUCTURES
Herbert Krause, Rockford, Ill., assignor to Atwood Vacuum Company, Rockford, Ill., a corporation of Illinois
Filed Nov. 20, 1967, Ser. No. 684,183
Int. Cl. F16c 29/02
U.S. Cl. 308—3                              17 Claims

ABSTRACT OF THE DISCLOSURE

This seat slide structure has, in lieu of the usual balls and/or rollers for anti-friction bearing support of one channel on the other, a cylindrical elongated tube of plastic material, like nylon, having a slippery surface and which provides line bearing contact substantially its full length on opposed walls and on the web of the movable channel for easier seat adjustment by virtue not only of the special material used but also the lower unit bearing pressure. This construction also enables increased seat travel. Elongated bowed spring strips under the nylon tubes insure their return to cylindrical form when deformed to oval cross-section. Similar results are obtainable if the hollow plastic bearing member is of U-shaped cross-section. Also, while full length bearing members are preferred, it is possible to use two longitudinally spaced elongated bearing members. Also, the flexibility of these plastic bearing members makes them suitable for use in seat slides of arcuate channel form, high at the mid-point of length and low at opposite ends, such slides giving automatically a desirable forward inclination of the seat back with forward adjustment and rearward inclination with rearward adjustment, without the necessity for means for tilting adjustment.

This invention relates to seat slide structures for use with adjustable seats for vehicles such as automobiles and trucks.

The principal object of my invention is to provide, in lieu of the usual balls and/or rollers for low friction rolling support of an upper channel member in its longitudinal movement relative to a fixed lower channel member for adjustably supporting a seat carried on a pair of such upper channel members, elongated low friction cylindrical bearing elements retained in the one channel against endwise movement and providing line bearing contact for low friction sliding support for the other channel members in the adjusting of the seat back and forth. The lower friction is due partly to the better distribution of the load by the line contact throughout the major portion usually of the length of the new bearing elements, in contrast to the concentration of the load at so few points with balls or rollers, and partly because of the low friction plastic material, such as nylon, used in the bearing elements. While this construction makes for easier adjustment of the seat, and consequently much longer life of the assembly, car and truck manufacturers are even more interested in the fact that it enables seat adjustment of nearly 10 inches, whereas with rollers and/or balls, much shorter slide travel was possible, even when special features were added to give increased travel. Another advantage is that these elongated low friction bearing elements lend themselves nicely to use in arcuate seat slide structures with less tendency for binding, arcuate seat slides having the advantage that the back of the seat is given forward inclination automatically with forward adjustment of the seat and is given rearward inclination automatically with rearward adjustment of the seat.

The invention is illustrated in the accompanying drawings, in which:

FIG. 1 is a plan view of a seat slide structure embodying the improvements of my invention;

FIG. 2 is a longitudinal section on the line 2—2 of FIG. 1;

FIG. 3 is an end view;

FIG. 4 is a cross-section showing a similar construction, but omitting the pre-load flat leaf spring;

FIG. 5 is another section similar to FIG. 4, but showing the use of a modified or alternative form of elongated plastic bearing element;

FIG. 6 is a section similar to FIG. 2 but illustrating another modified or alternative construction, utilizing shorter length leaf springs and plastic tubular bearing elements, and FIG. 7 is a longitudinal section similar to FIG. 2, but showing a construction like FIG. 4, but having the telescoping members bent to arcuate form, high at the middle and low at both ends, for automatically inclining the back of the seat properly with respect to the seat bottom for different positions of seat adjustment.

Similar reference numerals are applied to corresponding parts throughout the views.

Referring first to FIGS. 1 to 3, the seat slide structure illustrated comprises the channel-shaped upper slide member 10 and a channel-shaped lower slide member 11 disposed with their open sides toward one another. The upper slide member 10 carries studs 12 and 13 near its opposite ends for the fastening of a seat frame (not shown) on the slide structure. In like manner, the lower slide member 11 has downwardly extending studs 14 and 15 near its opposite ends for the mounting of the slide structure on the floor in the car or truck. Slide members 10 and 11 are both formed by steel channels, the upper slide member having a web 16 with depending side walls 17 and 18 that have outturned flanges 19 and 20, the edges of which are bent inwardly, as shown at 21, to define guideways therein to receive the outwardly directed flanges 22 provided on the side walls 23 of the fixed lower slide member 11, the web portion of which is indicated at 24. At flat steel leaf spring 25 that is normally arched from one end to the other to provide a pre-load spring tension when assembled in the seat slide structure, as it appears in FIG. 2, is carried in the lower slide member 11 on the web 24 thereof and bears against the underside of an elongated cylindrical low friction bearing element 26, provided in the form of a piece of extruded nylon tubing that has line contact its full length on the channel side walls 17 and 18 at 27, and 28 respectively, and along the middle of the top on the web 16 at 29. Similar line contact the full length of bearing element 26 occurs at 30 and 31 on the sides of the lower channel 11 and along the middle of the bottom at 32 on the pre-load spring strip 25.

33 is a latch for locking the seat in different adjusted positions by engagement of the vertical tooth 34 on the latch in any selected notch 35 provided in uniformly spaced relation in the rack provided on the flange 22 on the fixed lower channel member 11. The latch 33 is oscillatable by means of a lever 36 welded, as at 37, to the underside of the latch plate and extending laterally and forwardly with respect to the seat for convenient operation from the left hand side thereof, the latch plate being pivoted on a vertical axis, as at 38, to the underside of a horizontal plate 39 that is welded to the top of the upper channel member 10 and extends downwardly from the far side of the seat slide structure, as indicated at 40, for engagement with either one of two horizontal stop plates 41 and 42 that are welded to the bottom of the fixed lower channel member 11 and project laterally therefrom into the path of the downwardly bent portion 40 of the plate 39, whereby positively to limit the travel of the seat in either direction. A coiled tension spring 43 connected at one end to the upper seat slide member 10 and at the other end to the latch plate serves normally to urge the latch into locking position, a notch 44 provided in the channel formed edge portion 21 on the upper seat slide member 10 providing operating clearance for the tooth 34 of the latch plate.

In operation, the elongated cylindrical tubular bearing members 26 of extruded nylon or other low friction plastic material by virtue of line contact at six spaced points on each bearing member, three in the upper channel 10 and three in the lower channel 11, all substantially the full length or at least the major portion usually of the length of the tube, make for much easier adjustment of the seat than was possible with even the best ball and/or roller anti-friction constructions heretofore available, many of which had a tendency toward binding, due no doubt to the point and/or short line engagement and the consequent high unit bearing pressure. The pre-loaded spring strips 25 I have found to be desirable from the standpoint of exerting enough pressure on the plastic bearing elements 26 in the intervals between running the car or truck to cause the bearing elements 26 to return to normal cylindrical form or at least nearly so, so that they do not take a set in a somewhat oval form in section, which they would therwise be apt to assume, especially under heavy loading of the seat for prolonged intervals, especially in warm or hot weather. The present novel construction, as pointed out before, aside from the easier operation which it affords, is of particular interest to the car and truck manufacturers because of the much longer seat travel (approximately 10 inches) which this construction makes possible, as compared to the much shorter seat travel afforded by the ball and/or roller constructions that were available heretofore.

Sheet metal clips 45 are shown in FIGS. 2 and 3 as engaged in opposite ends of the plastic tubular bearing element 26 to hold the same in fixed relation to the lower channel 11, along with the pre-load spring strip 25, the clips 45 being fastened in place by the heads of the studs 14 and 15, as indicated at 46. However, it should be understood that I may utilize only one of these clips 45 at one end and, as shown in FIG. 6, provide a punched up lug 47 from the web 24' of the fixed lower channel 11' to hold the other end of the bearing element 26. Also, in lieu of a full length tube 26 I may, as shown in FIG. 6, provide two shorter lengths 26' of tubing, each fastened at the outer end by clips 45, the same as in FIG. 2, and at the inner end by a lug 47 punched out of the web portion 24' of the lower fixed channel member 11', the clips and lugs serving for fastening also the shorter length pre-load spring strips 25' in each assembly. Shortening the length of the plastic tubing employed involves a sufficient saving in cost to make this FIG. 6 type of construction more competitive with the old ball and/or roller constructions, without sacrificing too much of the advantages gained with the use of the plastic tubing bearing members, the main sacrifice being less easiness of operation because of the increase in unit bearing pressure going with the decrease in length of bearing support.

As shown in FIGS. 4 and 7, it is practical and feasible to utilize the extruded plastic tubing 26 alone as the bearing element or elements, without the pre-load spring strip 25, the tubular bearing element 26 having line contact at the three places 27, 28 and 29 in the upper channel member 10 and similarly at the three places 30, 31 and 32' in the lower channel member 11", the only difference in the lower channel 11" being that the contact at 32' is directly on the web 24" instead of on the intermediate pre-load spring strip 25.

Referring to FIG. 7 the channel members 10a and 11a in this form are the same as channels 10 and 11 of FIG. 2, or 10 and 11' of FIG. 6, or 10 and 11" of FIG. 4, except that here the two telescoping channel members are bent to arcuate form on a long radius so that the middle portion 48 is high in relation to the end portions 49 and 50, and, when the seat carried on this slide structure is adjusted forwardly, the back of the seat is automatically inclined forwardly in relation to its previous position, and vice versa with rearward adjustment of the seat, thereby making for more comfortable driving for a short legged person with forward adjustment of the seat and for a longer legged person with rearward adjustment of the seat, while avoiding the necessity for providing a separate tilting adjustment for the seat. While I have shown here a single full length plastic tubular cylindrical bearing member flexible to conform to the curvature of the channels, it will be clear that I may again use two shorter lengths the same as in FIG. 6, so I have accordingly indicated by dot and dash lines a—a and b—b where their inner ends are located.

While I have shown cylindrical plastic tubing for the bearing elements 26, it should be understood that the invention is not to be regarded as necessarily limited to that specific form, because, as shown in FIG. 5, the plastic bearing element 26" may be of U-shaped cross-section, providing a semi-circular upper half portion 51 that has line contact at the three points 27, 28 and 29 in the upper channel member 10 similarly as with the cylindrical tubular bearing members 26, while the parallel vertical sidewalls 52 have surface to surface engagement on their outer sides with the side walls 23 of the lower channel member 11 and rest on the web portion 24 at their lower edges, or on the edge portions of a pre-load spring strip 25 interposed between the plastic bearing element 26" and the bottom of the channel 11, similarly as in FIG. 2.

It is believed the foregoing description conveys a good understanding of the objects and advantages of my invention. The appended claims have been drawn to cover all legitimate modifications and adaptations.

I claim:

1. A slide structure comprising, in combination, a pair of opposed and relatively slidable elongated channel members, each having in the channel cross-section thereof a web between uniformly spaced upright side walls the opposed inside surfaces of which are adapted to serve as bearing surfaces, said channel members having troughs of substantially the same width, elongated cylindrical bearing member means of uniform diameter from end to end fitting lengthwise in the troughs of said channel members with a line bearing contact substantially the full length along three parallel lines in each of said channel members, namely, on the opposite side wall of each trough and along the middle of the web portion, means holding said bearing member means against endwise displacement with respect to one of said channel members, the channel members being formed from sheet metal and the spaced upright side walls of said members being bent to define outwardly projecting flanges, the longitudinal edge portions of the outwardly projecting flanges on one of said members being bent inwardly toward each other to enclose the longitudnal edge portions of the outwardly projecting flanges on the other channel member to hold said members in assembled telescoping relation, means for securing one of said members to a support, and means for securing the other of said members to a part to be slidably supported.

2. A slide structure as set forth in claim 1, wherein the telescoping channel members are of arcuate form on a long radius and disposed with the mid portion of their length higher and the end portions lower, said bearing member means being flexible to conform to the curvature of the channel members.

3. A slide structure as set forth in claim 1, wherein the telescoping channel members are of arcuate form on a long radius and disposed with the mid portion of their length higher and the end portions lower, said bearing member means being flexible to conform to the curvature of the channel members and being of one length extending the major portion of the length of said channel members.

4. A slide structure as set forth in claim 1, wherein the telescoping channel members are of arcuate form on a long radius and disposed with the mid portion of their length higher and the end portions lower, said bearing member means being flexible to conform to the curvature of the channel members and being of non-metallic material.

5. A slide structure as set forth in claim 1, wherein the telescoping channel members are of arcuate form on a long radius and disposed with the mid portion of their length higher and the end portions lower, said bearing member means being flexible to conform to the curvature of the channel members and being of non-metallic material and being in a plurality of lengths spaced relative to one another and together extending the major portion of the length of said channel members.

6. A slide structure as set forth in claim 1 wherein the cylindrical bearing member means is of one-piece construction and extends the major portion of the length of the channel member in which the same is mounted and held against endwise displacement.

7. A slide structure as set forth in claim 1 wherein the cylindrical bearing member means is of non-metallic lubricious material and extends the major portion of the length of the channel member in which the same is mounted and held against endwise displacement.

8. A slide structure as set forth in claim 1 wherein the cylindrical bearing member means is of non-metallic lubricious material and in a plurality of elongated spaced lengths which together extend the major portion of the length of the channel member in which the same is mounted and held against endwise displacement.

9. A slide structure as set forth in claim 1 wherein the cylindrical bearing member means is of non-metallic lubricious material and extends the major portion of the length of the channel member in which the same is mounted and held against endwise displacement, the cylindrical bearing member means being tubular and slightly yieldable under pressure and having a substantially uniform wall thickness throughout.

10. A slide structure as set forth in claim 1, wherein the channel members are spaced vertically relative to one another, and the trough in that one of said channel members in which the cylindrical bearing member means is mounted and held against endwise displacement is deeper than the trough in the other channel member, said bearing member means being of non-metallic lubricious material that is slightly yieldable under pressure, the slide structure including elongated bowed leaf spring means extending lengthwise of the bottom of the deeper channel, said spring means being compressible between the cylindrical bearing member means and the bottom of the deeper channel and exerting spring pressure on the bearing member means in a direction substantially at right angles to the direction of relative movement of the channel members, whereby resiliently to urge the cylindrical bearing member means bodily toward the trough in the other channel member.

11. A slide structure as set forth in claim 1, wherein the channel members are spaced vertically relative to one another, and the trough in that one of said channel members in which the cylindrical bearing member means is mounted and held against endwise displacement is deeper than the trough in the other channel member, said bearing member means being of non-metallic lubricious material that is slightly yieldable under pressure, the slide structure including elongated bowed leaf spring means extending lengthwise of the bottom of the deeper channel, said spring means being compressible between the cylindrical bearing member means and the bottom of the deeper channel and exerting spring pressure on the bearing member means in a direction substantially at right angles to the direction of relative movement of the channel members, whereby resiliently to urge the cylindrical bearing member means bodily toward the trough in the other channel member, the cylindrical bearing member means being tubular and therefore more yieldable and having substantially uniform wall thickness throughout and extending throughout the major portion of the length of the channel member in which the same is mounted and held against endwise displacement.

12. A slide structure comprising, in combination, a pair of opposed and relatively slidable elongated channel members, each having in the channel cross-section thereof a web between uniformly spaced upright side walls the opposed inside surfaces of which are adapted to serve as bearing surfaces, said channel members having troughs of substantially the same width, elongated bearing member means entered lengthwise in the trough of one of said channel members and having a substantially semi-cylindrical portion projecting therefrom and having line bearing contact substantially its full length along three parallel lines in the other of said channel members, namely, on the opposite side walls and along the middle of the web portion, means holding said bearing member means against endwise displacement with respect to the channel member in which it is mounted, the channel members being formed from sheet metal and the spaced upright side walls of said members being bent to define outwardly projecting flanges, the longitudinal edge portions of the outwardly projecting flanges on one of said members being bent inwardly toward each other to enclose the longitudinal edge portions of the outwardly projecting flanges on the other channel member to hold said members in assembled telescoping relation, means for securing one of said members to a support, and means for securing the other of said members to a part to be slidably supported.

13. A slide structure, as set forth in claim 12, wherein the bearing member means is of one-piece construction and extends the major portion of the length of the channel member in which the same is mounted.

14. A slide structure, as set forth in claim 12, wherein the bearing member means is of non-metallic lubricious material, and extends the major portion of the length of the channel member in which the same is mounted.

15. A slide structure, as set forth in claim 12, wherein the bearing member means is of non-metallic lubricious material and in a plurality of elongated spaced lengths which together extend the major portion of the length of the channel member in which the same is mounted.

16. A slide structure, as set forth in claim 12, whereing the bearing member means is of non-metallic lubricious material and extends the major portion of the length of the channel member in which the same is mounted, the bearing member means being hollow and of generally U-shaped cross-section and slightly yieldable under pressure and having a substantially uniform wall thickness throughout.

17. A slide structure, as set forth in claim 12, whereing the bearing member means is of non-metallic lubricious material and extends the major portion of the length of the channel member in which the same is mounted, the bearing member means being hollow and or generally U-shaped cross-section and slightly yieldable under pressure and having a substantially uniform wall thickness throughout, the slide structure including elongated bowed leaf spring means extending lengthwise of the bottom of the channel in which the bearing member means is mounted, said spring means being compressible between the bearing member means and the bottom of its channel member and serving to exert pressure on the bearing member means in a direction substantially at right angles to the direction of relative movement of the channel members whereby resiliently to urge the bearing member means bodily toward the trough in the other channel member.

References Cited

UNITED STATES PATENTS

| | | |
|---|---|---|
| 1,005,055 | 10/1911 | Miller. |
| 3,086,826 | 4/1963 | Gunnell. |
| 3,112,627 | 12/1963 | Gissel _____ 308—3 |
| 3,143,758 | 8/1964 | Dunham. |
| 3,226,830 | 1/1966 | Everitt _____ 308—6 X |
| 3,360,306 | 12/1967 | Vargady _____ 308—4 |

FOREIGN PATENTS 719,236  3/1942  Germany.

EDGAR W. GEOGHEGAN, Primary Examiner

L. L. JOHNSON, Assistant Examiner

U.S. Cl. X.R.

248—420, 429; 308—3.6, 4